United States Patent
Brunt, Jr.

(10) Patent No.: US 10,675,823 B2
(45) Date of Patent: Jun. 9, 2020

(54) TRIPLET LENS METHOD OF MANUFACTURE

(71) Applicant: LumenFlow Corp., Wyoming, MI (US)

(72) Inventor: Harold W. Brunt, Jr., Grand Rapids, MI (US)

(73) Assignee: LumenFlow, Zeeland, MI (US)

( * ) Notice: Subject to any disclaimer, the term of this patent is extended or adjusted under 35 U.S.C. 154(b) by 78 days.

(21) Appl. No.: 15/700,574

(22) Filed: Sep. 11, 2017

(65) Prior Publication Data

US 2019/0077103 A1    Mar. 14, 2019

(51) Int. Cl.
| | | |
|---|---|---|
| *B29D 11/00* | (2006.01) | |
| *G02B 3/00* | (2006.01) | |
| *G02B 9/16* | (2006.01) | |
| *G02B 1/04* | (2006.01) | |
| *B29K 83/00* | (2006.01) | |

(52) U.S. Cl.
CPC .. *B29D 11/00403* (2013.01); *B29D 11/00442* (2013.01); *G02B 3/00* (2013.01); *G02B 9/16* (2013.01); *B29K 2083/00* (2013.01); *G02B 1/041* (2013.01); *G02B 2003/0093* (2013.01)

(58) Field of Classification Search
CPC ...... B29D 11/00403; G02B 3/00; G02B 9/16; G02B 1/041; G02B 2003/0093
See application file for complete search history.

(56) References Cited

U.S. PATENT DOCUMENTS

| | | | |
|---|---|---|---|
| 2,417,942 A | 3/1947 | Miles | |
| 3,410,631 A | 11/1968 | Schwartz | |
| 4,577,927 A | 3/1986 | Raney | |
| 5,448,382 A | 9/1995 | Land et al. | |
| 5,458,819 A * | 10/1995 | Chirila | A61F 2/142 264/1.7 |
| 6,503,632 B1 * | 1/2003 | Hayashi | A61K 8/898 428/447 |
| 7,006,223 B2 | 2/2006 | Mullani | |
| 2016/0305629 A1 | 10/2016 | Brunt, Jr. | |

FOREIGN PATENT DOCUMENTS

KR   101615380 B1   4/2016

OTHER PUBLICATIONS

The International Search Report and Written Opinion of International Application No. PCT/US18/49714 dated Oct. 18, 2018.

* cited by examiner

*Primary Examiner* — Mathieu D Vargot
(74) *Attorney, Agent, or Firm* — Warner Norcross + Judd LLP

(57) ABSTRACT

A method of forming a compound lens includes molding multiple lens elements to form a compound lens. The multiple lens elements are molded from polymers that provide each lens element with the desired optical properties. First and second lens elements formed from a first polymer can be molded around a central, third element formed from a second polymer that differs from the first polymer by the addition of a cyclic substituent group. During curing of the lens elements, cross-links are formed between the first and second polymers to form an molded, integrally formed compound lens.

20 Claims, 3 Drawing Sheets

TRIPLET LENS METHOD OF MANUFACTURE

BACKGROUND OF THE INVENTION

The present invention relates to a method of forming compound lenses, particularly triplet lenses, in which multiple lens elements are integrally molded.

Compound lenses include multiple lenses arranged to provide a desired optical feature. Compound lenses are often used in imaging, for example with cameras or telescopes, to correct for optical aberrations. A triplet lens is a compound lens that includes three individual lenses arranged to correct for chromatic and spherical aberrations. The individual lenses can be spaced apart, such as in a Cooke triplet, or bonded together. Two common types of bonded triplets are the Steinheil triplet and the Hastings triplet. The Steinheil triplet includes a low refractive index center lens bonded with identical high refractive index outer lenses. The Hastings triplet includes a high refractive index center lens bonded with identical low refractive index outer lenses. A Hastings triplet is commonly used for making magnifying devices, such as a jeweler's loupe.

The individual lenses in a Steinheil or Hastings triplet are bonded together using an adhesive, such as a transparent optical bonding cement. Bonding the individual lenses together can be time consuming and if not done correctly, can negatively affect the optical properties of triplet. For example, if a crown lens is not centered on the flint, the light transmitted through the triplet may not be focused. In addition, the adhesive used in bonding the lenses can degrade over time or when exposed to a suitable solvent, which may cause the lenses to shift or separate from one another.

It would therefore be beneficial to provide a process for forming a triplet lens without the use of an adhesive to bond the individual lenses together. It would also be beneficial to provide a lens that exhibits optical features similar to a compound lens without the use of multiple individual lenses.

SUMMARY

A method of forming a compound lens from multiple, integrally formed lens elements is provided. The method includes molding multiple lens elements to form a compound lens without the use of an adhesive. The multiple lens elements are molded from polymers that provide each lens element with the desired optical properties such that when the lens elements are formed, they provide a single, integrally formed compound lens. Each lens element is formed from a polymer that is capable of cross-linking with a polymer forming an adjacent lens element at a boundary between the lens elements. The molded compound lens can exhibit similar optical features as a traditional compound lens, but is formed as a single, unitary lens rather than multiple independent lenses bonded through an adhesive.

In one embodiment, a method of forming a compound lens includes providing a mold having a mold cavity corresponding to a shape of the compound lens. First and second lens elements can be co-molded within the mold cavity from a first polymer. The first lens element can be spaced apart from the second lens element in the mold cavity. A third lens element is molded within a portion of the mold between the first and second lens elements from a second polymer. The third lens element adheres to each of the first and second lens elements to form an integrally molded compound lens. The second polymer differs from the first polymer by the addition of a cyclic substituent group. During curing of the third lens element between the first and second lens elements, cross-linking occurs between the first and second polymers.

In another embodiment, a method of forming a compound lens includes providing a mold having a mold cavity corresponding to a shape of the compound lens. A first lens element including a first polymer is formed in a first portion of the mold. A second lens element including a second polymer is formed in a second portion of the mold. A third lens element comprising a third polymer is formed in a third portion of the mold which is disposed between the first and second portions of the mold. The first polymer and second polymer are adapted to adhere to the third polymer during molding to form an integrally molded compound lens. At least one of the first, second, or third polymers includes a cyclic substituent group. During curing of the third lens element between the first and second lens elements, cross-linking occurs between the first and third polymers and the second and third polymers.

The embodiments of the present invention can provide a single, integrally formed optical lens that exhibits optical features similar to a compound lens formed from multiple individual lenses. The integrally formed lens does not break down into individual elements in the same manner as traditional compound lenses which are formed using an adhesive to bond multiple individual lenses together. The integrally formed compound lens eliminates the use of adhesives in forming a compound lens. In addition, the integrally formed lens can be formed with each element properly aligned, thus saving time and costs associated with aligning individual lenses for attachment with an adhesive. These and other advantages and features of the invention will be more fully understood and appreciated by reference to the drawings and the description of the current embodiments.

DESCRIPTION

I. Introduction

Figure 1:
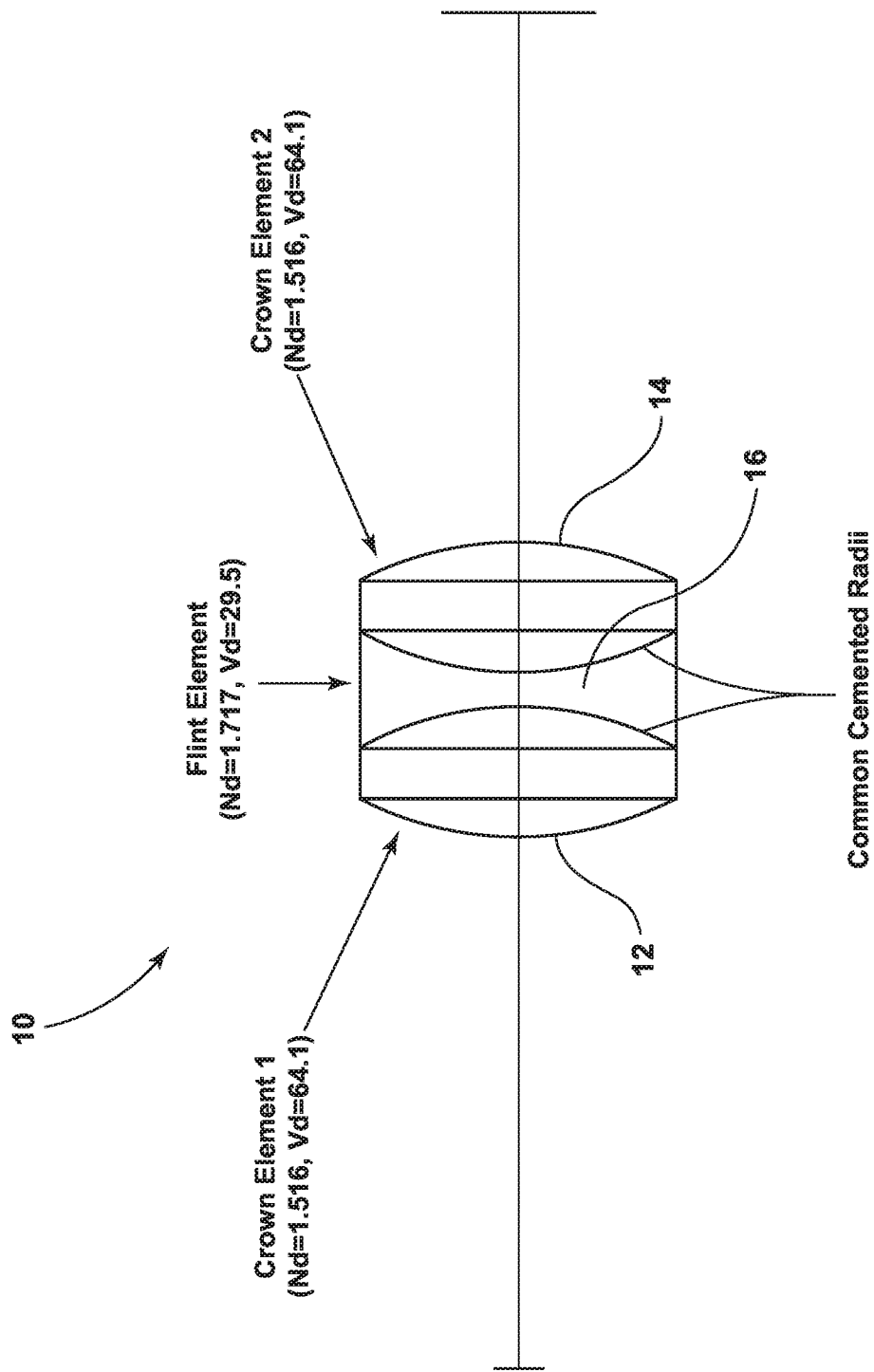
FIG. 1 is cross-sectional view of a conventional Hasting triplet lens according to the prior art.

FIG. 1 illustrates a conventional Hasting triplet lens 10 formed by bonding two positive crown lenses 12, 14 to a central negative flint lens 16 using an adhesive. A Hasting triplet is often used in forming a magnifying lens, such as jeweler's loupe. Triplet compound lenses are often used to form an apochromatic lens having high chromatic performance, while reducing spherical and comatic aberrations. The crown lenses 12, 14 are typically formed from a low refractive index glass having a high Abbe number (also referred to as V-number). The flint lens 16 is typically formed from a high refractive index glass having a low Abbe number.

Each of the crown lenses 12, 14 are bonded on opposite sides of the flint lens 16 using an optical bonding cement. The optical bonding cement is transparent cement that is typically selected to have an index of refraction that is approximately the average value of the index of refraction of the crown lenses 12, 14 and the flint lens 16. For example, a traditional Hasting triplet can include crown lenses 12, 14 made from a borosilicate glass, such as N-BK7® available from Schott, having a refractive index (Nd) of 1.516 and an Abbe number (Vd) of 64.1. The flint lens 16 can be made from an inorganic glass, such as N-SF1 available from Schott, having a refractive index of 1.717 and an Abbe number of 29.5. The optical bonding cement would be selected to have a refractive index that is approximately the average of these two materials, in this case about 1.615.

Each lens 12, 14, and 16 in the conventional triplet 10 must be aligned and bonded to the adjacent lens 12, 14, and 16 using the optical bonding cement. The alignment process can be time consuming and errors in the alignment process can impact the performance of the triplet lens 10. In addition, because each lens 12, 14, and 16 is individually bonded to an adjacent lens using an adhesive tie layer, the lenses 12, 14, and 16 may shift relative to one another or separate over time. In addition, exposure to an environment that degrades the optical bonding cement can result in the triplet 10 separating into its individual lenses 12, 14, and 16.

II. Structure

Figure 2:
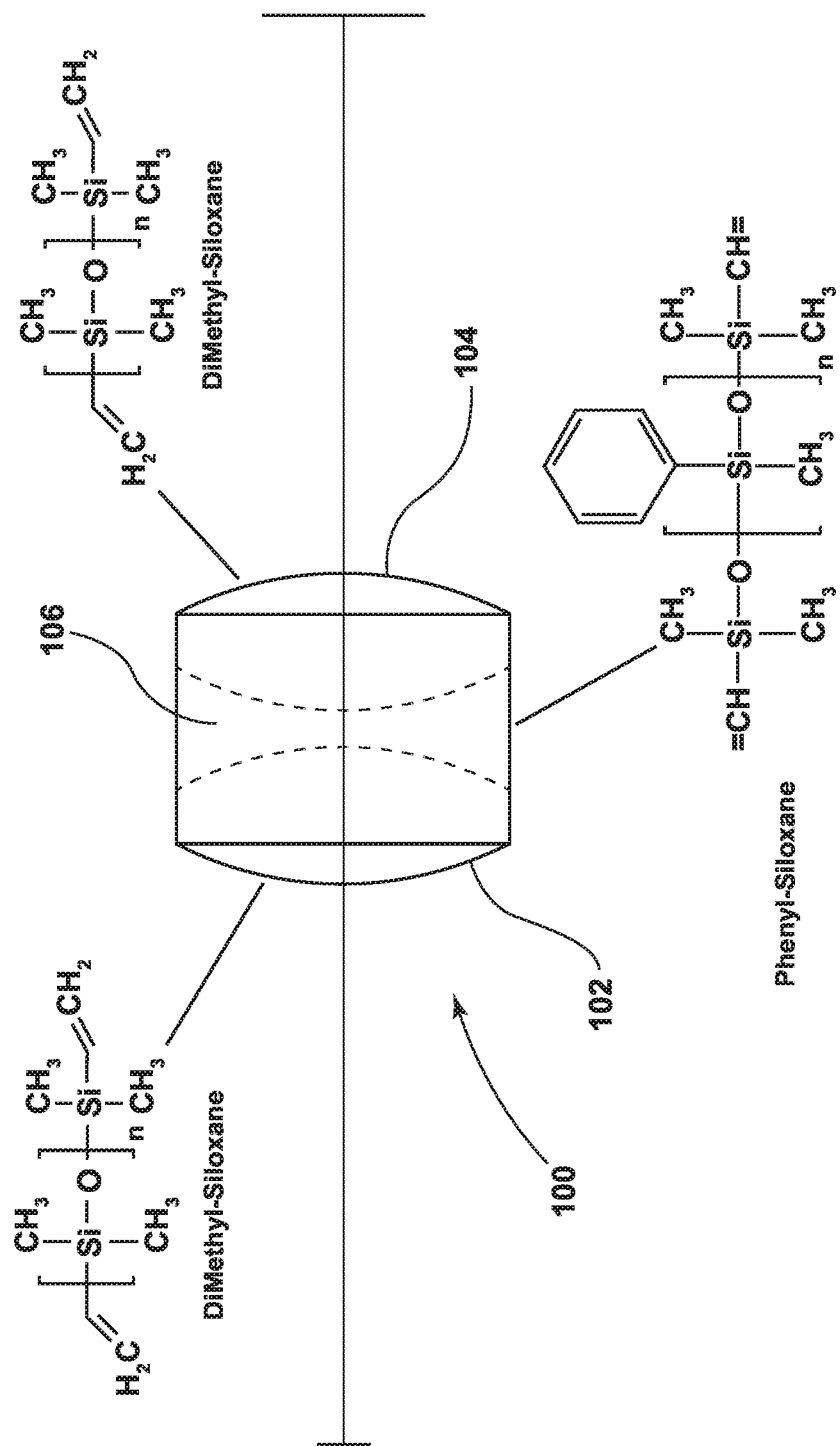
FIG. 2 is a cross-sectional view of an integrally molded Hastings triplet lens according to an embodiment of the invention.

A compound lens in accordance with an embodiment of the invention is depicted in FIG. 2 and generally designated 100. The compound lens 100 includes first, second, and third lens elements 102, 104, and 106, respectively, that are integrally formed in a molding process. While the embodiments of the invention are described in the context of a compound lens 100 in the form of a Hasting triplet, as is discussed in more detail below, the embodiments of the invention may be used to form other types of compound lens comprising fewer or greater lens elements.

The compound lens 100 includes outer lens elements 102, 104 and inner lens element 106 that are made from a polymeric material that is optically transparent and moldable. In addition, the polymeric material used to form each of the lens elements 102, 104, and 106 is selected so as to be cross-linkable with the polymeric material used to form an adjacent lens element. In the configuration illustrated in FIG. 2, the polymers forming the outer lens elements 102, 104 are selected so as to interact with and form cross-links with the polymers forming the inner lens element 106 As also shown in FIG. 2, the compound lens 100 is formed so that an optical path or axis extends sequentially through the first outer lens element 102, the inner, or third, lens element 106 and the second outer lens element 104.

The polymers used to form each of the lens elements 102, 104, and 106 can be selected to provide the compound lens 100 with the desired optical properties. In one example, the polymers selected to form each of the lens elements 102, 104, and 106 are selected based on their index of refraction and/or Abbe number such that when combined the compound lens 100 has the desired optical properties. Suitable polymers may have the same or different polymer backbone. In certain embodiments, the polymers selected to form the lens elements 102, 104, and 106 have the same polymer backbone but differ in the type and/or amount of substituent groups. For example, substituting a methyl group with an aromatic or cycloalkane ring substituent group can change the optical properties of the material, such as the index of refraction and the Abbe number.

An exemplary polymeric material for forming the lens elements 102, 104, and 106 includes a polydimethylsiloxane (PDMS) based polymer. Functionalization of the siloxane polymer backbone can be used to provide polymers having different optical properties for use in forming lens elements 102, 104, and 106 which, when combined, provide the compound lens 100 with the desired optical properties. For example, substituting at least a portion of the methyl substituents in PDMS with an aromatic or cycloalkane ring substituent group changes the optical properties of the material, such as the index of refraction and the Abbe number.

In an exemplary configuration, the compound lens 100 includes outer lens elements 102, 104 molded from PDMS, which has an index of refraction of 1.425 and an Abbe number of 46.5. The inner lens element 106 can be molded from a phenyl-siloxane in which at least some of the methyl substituents in PDMS have been replaced with a phenyl group. The phenyl-siloxane has an index of refraction of 1.551 and an Abbe number of 32.8. The addition of the phenyl substituent group to the siloxane backbone increases the index of refraction of the phenyl-siloxane compared to PDMS. The PDMS and phenyl-siloxane materials provide the lens elements 102, 104 and 106, respectively, with the optical properties needed for forming a Hastings triplet. The lens elements 102, 104 can be formed in the shape of a positive crown element and combined with a lens element 106 that has been formed in the shape of a negative flint element, and which has a lower index of refraction than the outer lens elements 102, 104, to form a Hasting triplet.

The lens elements 102, 104 are integrally molded with the lens element 106 to form a compound lens 100 in which the material forming the lens elements 102, 104 interact and form cross-links with the material forming the lens element 106. In this manner, the compound lens 100 is formed from integrally molded lens elements that are cohered to each other rather than separately formed lenses which are bonded together through the use of an adhesive. The materials used to form each of the lens elements 102, 104, and 106 are selected such that together they provide a compound lens 100 exhibiting the desired optical properties. The materials used to form the lens elements 102, 104, and 106 are also selected such that the polymers forming the lens elements 102, 104, and 106 are cross-linkable at similar temperatures.

Optionally, the polymer forming the outer lens elements 102, 104 and/or the polymer forming the inner lens element 106 can include a curing agent to facilitate cross-linking of the polymers forming the outer lens elements 102, 104 with the polymers forming the inner lens element 106. The curing agent is selected based on the polymers used to form the lens elements 102, 104, and 106. The amount of curing agent is selected to induce a desired degree of cross-linking between the polymer forming the outer lens elements 102, 104 and the inner lens element 106.

In the example described above for the Hasting triplet, the outer lens elements 102, 104 are formed from the same polymer while the inner lens element 106 is formed of a different polymer having optical properties that are different than the polymer used to form in the outer lens elements 102, 104. However, it will be understood that the compound lens 100 can be formed from any number of lens elements having individual optical properties that combine to provide the compound lens 100 with the desired optical property.

For example, each of the lens elements 102, 104, and 106 can be made from a different polymer having a different index of refraction and/or Abbe number such that when combined the compound lens 100 has the desired optical properties. In another example, the outer lens elements 102, 104 can be formed from a first polymer and the inner lens element 106 can be formed from a second polymer that is different from the first and has a higher index of refraction and/or Abbe number than the first polymer. In addition, each of the lens elements 102, 104, and 106 can be molded in any suitable shape, non-limiting examples of which include biconvex, plano-convex, positive meniscus, negative meniscus, plano-concave, biconcave, convex-concave, convex, and concave.

III. Method

Figure 3:
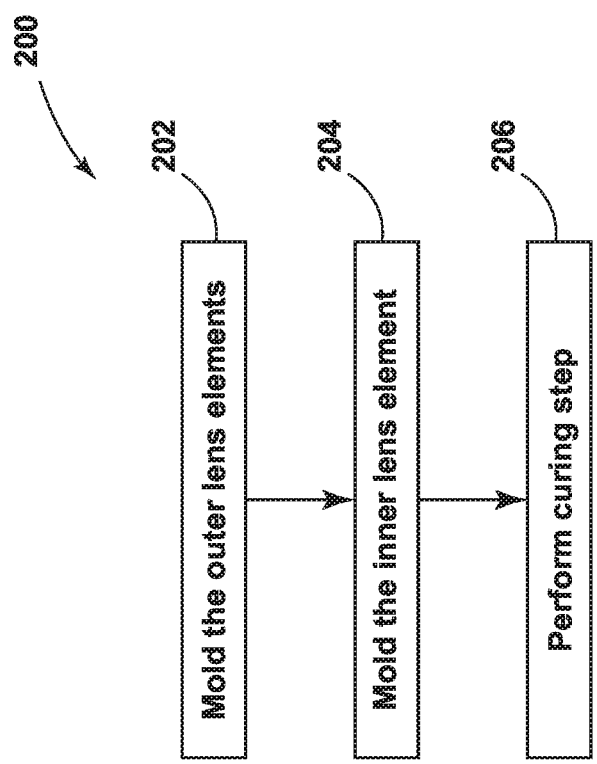
FIG. 3 is a flow chart illustrating a method of forming an integrally molded Hastings triplet lens according to an embodiment of the invention

FIG. 3 illustrates an exemplary method 200 for forming the compound lens 100 according to a molding process. The compound lens 100 can be formed using a mold having a mold cavity that corresponds to the shape of the compound lens 100. The mold cavity can be divided into portions corresponding to the shape of each of the lens elements forming the compound lens.

The method 200 can include molding the outer lens elements 102, 104 by providing a first polymer in molten form to first and second portions of the mold cavity. The first and second portions of the mold cavity can have a shape configured to provide the outer lens elements 102, 104 in the desired shape. In the example of forming a Hasting triplet, the first and second portions of the mold cavity can correspond to the shape of a positive crown element. Other mold cavity shapes are also possible, depending on the desired optical properties of the outer lens elements 102, 104. The first and second portions of the mold cavity can be spaced to provide a cavity therebetween within which the inner lens element 106 can be formed.

The outer lens elements 102, 104 can be formed simultaneously in a single shot or sequentially in a two-shot molding process. The first polymer used to form the outer lens elements 102, 104 is selected to provide the lens elements with the desired index of refraction and Abbe number. Processing parameters for molding the outer lens elements 102, 104, such as the molding temperature and pressure, can be selected based on the characteristics of the first polymer to provide outer lens elements 102, 104 having the desired shape and optical properties.

The molten first polymer can be allowed to at least partially cool and optionally partially cure within the first and second portions of the mold cavity prior to molding the inner lens element 106. Partial curing of the first polymer generates cross-linking between the polymer chains of the first polymer within each of the outer lens elements 102, 104. The first polymer can optionally include a curing agent to facilitate the formation of cross-links within the first polymer. The amount of curing agent and the cure processing parameters, such as time, temperature, and pressure, can be selected to provide the desired degree of cross-linking within the first polymer.

A second polymer is provided into a third portion of the mold cavity, between the first and second portions of the mold cavity, to form the inner lens element 106. The second polymer is different from the first polymer such that the inner lens element 106 exhibits different optical properties than the outer lens elements 102, 104. In one example, the second polymer differs from the first polymer by the addition of a cyclic substituent group, for example a ring group, to the polymer backbone of the first polymer. The presence of a cyclic substituent group provides the second polymer with an index of refraction and Abbe number that is different than the first polymer. In this manner, the inner lens element 106 is formed having different optical properties than the outer lens elements 102, 104.

Processing parameters for molding the inner lens element 106, such as the molding temperature and pressure, can be selected based on the characteristics of the second polymer to provide the inner lens element 106 with the desired optical properties. The third portion of the mold cavity is configured to provide the inner lens element 106 in the desired shape. The processing parameters can also be selected based on the properties of the first polymer used to mold the outer lens elements 102, 104.

In one example, heat from the molten second polymer in the third mold portion is sufficient to melt and/or soften adjacent surfaces of the outer lens elements 102, 104 such that the first and second polymers can interact at a boundary between the outer lens elements 102, 104 and the inner lens element 106. Optionally, additional heat may be supplied to melt and/or soften the first polymer at least at the boundary between the outer lens elements 102, 104 and the inner lens element 106. Melting and/or softening of the first polymer facilitates cross-linking between the first and second polymers at the boundary.

The method 200 includes a curing step at 206 to initiate cross-linking between the first polymer forming the outer lens elements 102, 104 and the second polymer forming the inner lens element 106. The curing step 206 can include the application of heat and/or pressure. In one example, the temperature of the molten second polymer during molding of the inner lens element 106 at step 204 is sufficient to initiate cross-linking. Alternatively, the temperature of the molded inner lens element 106 and/or the outer lens elements 102, 104 may be increased above the molding temperature to facilitate cross-linking between the first and second polymers. The cure processing parameters, such as time, temperature, and pressure, can be selected to provide the desired degree of cross-linking between the first and second polymers.

Optionally, one or both of the first or second polymers can include a curing agent to facilitate cross-linking between the first and second polymers. The amount of curing agent and the cure processing parameters, such as time, temperature, and pressure, can be selected to provide the desired degree of cross-linking between the first and second polymers.

Following the curing step 206, the first and second polymers are allowed to cool and are removed from the mold. The thus formed compound lens 100 includes first, second, and third lens elements which are adhered together without the use of an adhesive tie layer. The molded compound lens 100 exhibits similar optical features as a traditional triplet lens, but is formed as a single, unitary lens rather than multiple independent lenses. Unlike a traditional compound lens, the molded compound lens 100 described herein does not require alignment of individual lenses, which can save on production time and costs, and may also increase reproducibility in forming the compound lens. In addition, because the compound lens 100 is a single, unitary lens, rather than multiple lenses bonded together by an adhesive, the compound lens 100 will not separate into individual lenses when exposed to conditions which would degrade typical optical adhesives.

While the method 200 is described in the context of a first polymer for forming the outer lens elements 102, 104 and a second polymer for forming the inner lens element 106, it will be understood that the method 200 can be used in a similar manner to form each of the lens elements 102, 104, and 106 from a different polymer. In addition, rather than forming the outer lens elements 102, 104 prior to forming the inner lens element 106, the inner lens element 106 can be formed first. In another example, each of the lens elements 102, 104, and 106 can be formed sequentially. The method 200 can also be used to form an integrally formed compound lens having more than three lens elements and lens elements in any desired shape.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method of forming a compound lens comprising:
providing a mold having a mold cavity corresponding to a shape of a triplet lens including an inner lens element and first and second outer lens elements;
co-molding the first and second outer lens elements each comprising a first polymer within the mold cavity, the first outer lens element being spaced apart from the second outer lens element along the entirety thereof;
molding the inner lens element comprising a second polymer within a portion of the mold between the first and second outer lens elements, wherein the inner lens element adheres to each of the first and second outer lens elements to form an integrally molded triplet lens, and wherein the second polymer differs from the first polymer by the addition of a cyclic substituent group; and
removing the integrally molded triplet lens from the mold cavity, wherein cross-linking between the first and second polymers occurs during curing of the inner lens element between the first and second outer lens elements, and wherein the inner lens element includes first and second major surfaces that are opposite each other and that are co-joined with respective first and second outer lens elements, such that an optical path extends sequentially through the first outer lens element, the inner lens element, and the second outer lens element.

2. The method of claim 1 wherein the first polymer comprises a polydimethylsiloxane.

3. The method of claim 2 wherein the second polymer comprises a polydimethylsiloxane in which at least a portion of the methyl substituent groups is replaced by a cyclic substituent group including an aromatic ring or a cycloalkane ring.

4. The method of claim 1 wherein the first and second outer lens elements comprise a positive lens and the inner lens element comprises a negative lens.

5. The method of claim 1 wherein the triplet lens is a Hasting triplet such that the first and second outer lens elements are crown lens elements and the inner lens element is a flint lens element.

6. The method of claim 1 wherein the inner lens element defines an index of refraction that is greater than the index of refraction defined by the first and second outer lens elements.

7. The method of claim 1 wherein the first and second outer lens elements define an index of refraction of about 1.4.

8. The method of claim 1 wherein the inner lens element defines an index of refraction of about 1.5.

9. The method of claim 1 wherein a curing agent is provided with at least one of the first or second polymers to promote cross-linking between the first and second polymers occurs during curing.

10. A method of forming a compound lens comprising:
providing a mold having a mold cavity corresponding to a shape of a triplet lens;
forming a first outer lens element comprising a first polymer in a first portion of the mold;
forming a second outer lens element comprising a second polymer in a second portion of the mold, the second outer lens element being spaced apart from the first outer lens element along the entirety thereof;
forming a third inner lens element comprising a third polymer in a third portion of the mold, the third portion disposed between the first and second portions of the mold, wherein the first polymer and the second polymer adhere to the third polymer to form an integrally molded triplet lens; and
removing the integrally molded triplet lens from the mold, wherein at least one of the first, second, or third polymers includes a cyclic substituent group, and wherein cross-linking between the first and third polymers and the second and third polymers occurs during curing of the third inner lens element between the first and second outer lens elements, and
wherein the third inner lens element includes first and second major surfaces that are opposite each other and that are co-joined with respective first and second outer lens elements, such that an optical path extends sequentially through the first outer lens element, the third inner lens element, and the second outer lens element.

11. The method of claim 10 wherein the first polymer comprises a polydimethylsiloxane.

12. The method of claim 11 wherein the second polymer comprises a polydimethylsiloxane in which at least a portion of the methyl substituent groups is replaced by a cyclic substituent group including an aromatic ring or a cycloalkane ring.

13. The method of claim 10 wherein the triplet lens is free of tie layers between the first and second outer lens elements and the third inner lens element.

14. The method of claim 10 wherein forming the first and second outer lens elements comprises at least partially curing the first and second polymers prior to forming the third inner lens element or subsequent to forming the third inner lens element.

15. The method of claim 14 wherein forming the third inner lens element comprises at least partially curing the third polymer to promote cross-linking between the first and third polymers and the second and third polymers.

16. The method of claim 10 wherein at least one of the first, second, or third polymers comprise a curing agent.

17. The method of claim 10 wherein:
the first polymer has a first index of refraction;
the second polymer has a second index of refraction; and
the third polymer has a third index of refraction.

18. The method of claim 17 wherein the first and second indices of refraction are one of greater than or less than the third index of refraction.

19. The method of claim 18 wherein the first and second indices of refraction are the same.

20. The method of claim 10 wherein the first and second outer lens elements comprise a positive lens and the third inner lens element comprises a negative lens.

* * * * *